(12) United States Patent
Qin et al.

(10) Patent No.: US 12,529,802 B2
(45) Date of Patent: Jan. 20, 2026

(54) METHOD FOR CONTROLLING A POSITIONING CHIP AND ELECTRONIC DEVICE

(71) Applicant: BEIJING XIAOMI MOBILE SOFTWARE CO., LTD., Beijing (CN)

(72) Inventors: Muyun Qin, Beijing (CN); Guang Yu, Beijing (CN); Chin-lung Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 586 days.

(21) Appl. No.: 17/955,242

(22) Filed: Sep. 28, 2022

(65) Prior Publication Data

US 2023/0393288 A1 Dec. 7, 2023

(30) Foreign Application Priority Data

Jun. 7, 2022 (CN) .......................... 202210638444.2

(51) Int. Cl.
*G01S 19/47* (2010.01)
*H04W 64/00* (2009.01)
(52) U.S. Cl.
CPC ........... *G01S 19/47* (2013.01); *H04W 64/003* (2013.01)
(58) Field of Classification Search
CPC ...................................................... G01S 19/47
See application file for complete search history.

(56) References Cited

U.S. PATENT DOCUMENTS

| 2001/0002458 | A1* | 5/2001 | Kohli | ..................... H04B 1/709 342/357.33 |
| 2015/0071440 | A1* | 3/2015 | Raghupathy | ........ G06F 21/6245 380/258 |
| 2017/0347332 | A1* | 11/2017 | Cui | ......................... H04W 8/24 |

FOREIGN PATENT DOCUMENTS

| CN | 102801436 | A | * | 11/2012 | |
| CN | 105353384 | A | * | 2/2016 | |
| CN | 110366233 | B |   | 7/2021 | |
| CN | 113466908 | A | * | 10/2021 | ............. G01S 19/33 |

OTHER PUBLICATIONS

European Patent Application No. 22198828.0, Search and Opinion dated Jan. 26, 2023, 8 pages.

\* cited by examiner

*Primary Examiner* — Jack W Keith
*Assistant Examiner* — Clayton Paul Ridder
(74) *Attorney, Agent, or Firm* — Cozen O'Connor (57) ABSTRACT

A method for controlling a positioning chip includes: receiving a positioning request sent by an application; obtaining information of the application, and determining a working mode of the positioning chip based on the information of the application; and controlling resources for the positioning chip based on the working mode. The method may be implemented in an electronic device.

15 Claims, 5 Drawing Sheets

METHOD FOR CONTROLLING A POSITIONING CHIP AND ELECTRONIC DEVICE

CROSS-REFERENCE TO RELATED APPLICATIONS

This application is based on and claims priority to the Chinese Patent Application No. 202210638444.2, filed on Jun. 7, 2022, the entire content of which is incorporated herein by reference.

TECHNICAL FIELD

The present disclosure relates to a field of a positioning technologies, and particularly to a method for controlling a positioning chip, a control device, an electronic device and a storage medium.

BACKGROUND

With the continued development of technology, the pace of life and the intensity of work are increasing. Various applications are being installed in electronic devices in order to improve convenience of users when using the electronic devices. Moreover, a positioning chip is typically installed in an electronic device, to provide the user with the position information of the electronic device, so that the user may identify his own location. However, the power consumption of the positioning chip in the electronic device is relatively large.

SUMMARY

A method for controlling a positioning chip is provided. The method includes: receiving a positioning request sent by an application; obtaining information of the application, and determining a working mode of the positioning chip based on the information of the application; and controlling resources for the positioning chip based on the working mode.

An electronic device is provided, and includes: at least one processor; and a memory communicatively coupled to the at least one processor; the memory is stored with instructions executable by the at least one processor, and the processor is configured to: receive a positioning request sent by an application; obtain information of the application, and determining a working mode of the positioning chip based on the information of the application; and control resources for the positioning chip based on the working mode.

A non-transitory computer-readable storage medium stored with computer instructions is provided. The computer instructions are configured to perform a method for controlling a positioning chip, wherein the method including: receiving a positioning request sent by an application; obtaining information of the application, and determining a working mode of the positioning chip based on the information of the application; and controlling resources for the positioning chip based on the working mode.

BRIEF DESCRIPTION OF THE DRAWINGS

The drawings are intended to better understand the solution, and do not constitute a limitation to the present disclosure, in which.

DETAILED DESCRIPTION

The embodiments of the present disclosure described below with reference to the accompanying drawings are illustrative, which include various details of embodiments of the present disclosure to facilitate understanding, and should be considered as merely illustrative. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

With the development of science and technology, the pace of life and work intensity increase, and how to improve experience of a user has become a focus from all walks of life. For example, when the user uses an electronic device, the current location information of the user may be obtained by the electronic device, which may facilitate the travel of the user.

Figure 1:
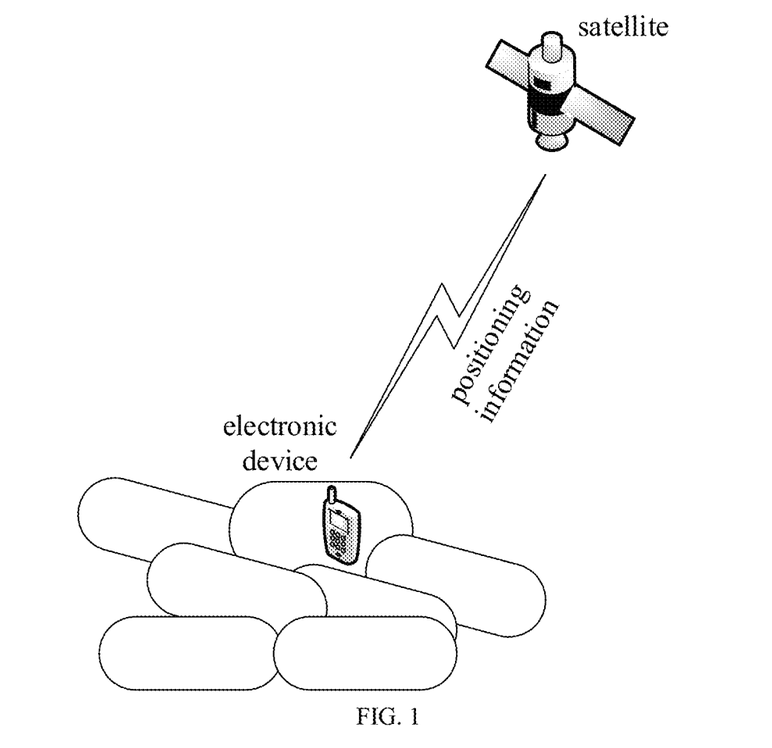
FIG. 1 is a schematic diagram of a system where a method for controlling a positioning chip may be used, as provided by an embodiment of the present disclosure.

FIG. 1 is a schematic background diagram of a method for controlling a positioning chip provided by an embodiment of the present disclosure. As shown in FIG. 1, when an electronic device obtains a click instruction for a positioning function, the electronic device may generate a positioning request, and may obtain location information, for example, determined by the Global Positioning System (GPS) satellite by the positioning chip.

It is easy to understand that outdoor positioning on the electronic device mainly relies on Global Navigation Satellite System (GNSS) chip. The GNSS chip has expanded from the earliest GPS single constellation to the latest four constellations that support GPS, GLONASS, "Galileo" satellite navigation and positioning system GALILEO and China's BeiDou Navigation Satellite System (BDS), and has expanded to the Quasi-Zenith Satellite System (QZSS) constellation and the Indian Regional Navigation Satellite System IRNSS L5. The electronic device usually also supports L5 frequency on GPS, GALILEO, BDS, QZSS, including the new GPS L2C signal. The power consumption of single constellation varies from to 20 mA and of full constellation varies from 60 to 100 mA.

According to some embodiments, due to openness of an Android interface for a full constellation GNSS chip on an electronic device, any application set on the electronic device may initiate a call to the GNSS chip, and all functions of the GNSS chip are enabled by default, such as L5 signal acquisition and simultaneous start of an inertial navigation fusion scheme. The application set on the electronic device includes but is not limited to navigation applications, sports health applications, game applications, banking applications, weather applications, etc. Even in indoor environment, relevant calls to the GNSS chip also exist. Therefore, an overhead problem of power consumption of the GNSS chip will be prominent.

It is easy to understand that the electronic device may intercept some third-party applications to call the GNSS chip, for example, by black and white lists or motion gesture recognition methods. There may be cases in which a working mode of the GNSS positioning chip is inaccurately determined. For example, there may be a situation in which only some functions may be used when all functions of the GNSS positioning chip are called. For example, in an outdoor scene, the working mode of the GNSS positioning chip is determined based on a signal strength, and the working mode determined may be inaccurate.

The present disclosure will be described in detail below with reference to specific embodiments.

Figure 2:
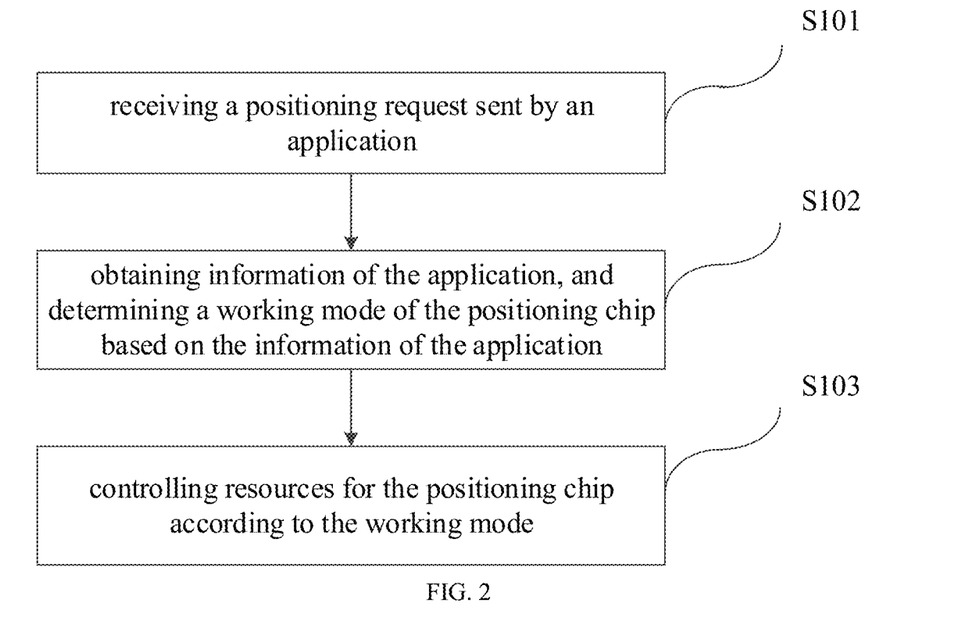
FIG. 2 illustrates a flow diagram of a method for controlling a first positioning chip provided in the embodiment of the present disclosure.

In the first embodiment, as illustrated in FIG. 2, which illustrates a schematic flow diagram of a method for controlling a first positioning chip provided in the embodiment of the present disclosure. The method may be implemented by computer program, and may be executed on a control device of the positioning chip. The computer program may be integrated into an application or executed as a stand-alone utility application.

An execution body of the embodiments of the present disclosure may be an electronic device carrier with power optimization for the positioning chip. For example, the control device of the positioning chip may be, for example, an electronic device with a positioning chip. The electronic device includes but is not limited to: a wearable electronic device, a handheld electronic device, a personal computer, a tablet computer, a vehicle electronic device, a smart phone, a computing electronic device or other processing electronics connected to a wireless modem, etc. In different networks, the electronic device may be called different names, for example, user electronic device, access electronic device, user unit, user station, mobile station, mobile station, remote station, remote electronic device, mobile electronic device, electronic equipment, wireless communication electronic device, user agent or user device, cellular telephone, cordless telephone, personal digital assistant (PDA), the fifth generation mobile communication technology (5G) network, the fourth generation mobile communication technology (4G) network, the third generation mobile communication technology (3G) network or the electronic equipment in the future evolution network.

Specifically, the method for controlling a positioning chip includes the following steps.

At S101, a positioning request sent by an application is received.

According to some embodiments, at least one application is installed in an electronic device of the embodiment of the present disclosure. For example, at least one third-party application may be installed in the electronic device of the embodiment of the present disclosure, and at least one system application may also be installed at the same time. The system application refers to the application developed by a software compiler corresponding to the electronic device. The third-party application does not specifically refer to a specific application. For example, when a name of the program corresponding to the system application changes, the system application may also change accordingly.

It is easy to understand that the third-party application refers to the related software developed by the user who is not the software compiler when the software in the electronic device or the application is insufficient in function. The third-party application does not specifically refer to a specific application. For example, when the application that receives the positioning instruction input for positioning changes, the third-party application may also change accordingly. For example, when a time point of receiving the positioning request changes, the third-party application may also change accordingly.

In some embodiments, the positioning request refers to a request sent by an application for positioning, and the positioning request refers to a request for determining actual location information of the electronic device by cooperation between the electronic device and a server. The positioning request does not specifically refer to a specific request. For example, when the application changes, the positioning request may also change accordingly. For example, when the time point of receiving the positioning request changes, the positioning request may also change accordingly.

According to some embodiments, the executive body of the embodiments of the present disclosure may be, for example, an electronic device. The electronic device may obtain a positioning request sent by the application, when the method for controlling the positioning chip is executed. The electronic device may receive a positioning request sent by a system application, and may also receive a positioning request sent by a third-party application.

At S102, information of the application is obtained, and a working mode of the positioning chip is determined based on the information of the application.

According to some embodiments, the information of the application refers to the information about the current application. The information of the application does not specifically refer to specific information. For example, when the state of the electronic device changes, the information of the application may also change accordingly. The state of the electronic device may be, for example, whether it is connected to a vehicle bracket, or whether it is connected to other step counting devices, etc.

In some embodiments, the positioning chip refers to a chip integrated with a positioning function, and the positioning chip does not specifically refer to a specific chip. For example, when a model of the positioning chip is changed, the positioning chip may also be changed accordingly. For example, when a navigation satellite system corresponding to the positioning chip changes, the positioning chip may also change accordingly.

It is easy to understand that the working mode refers to the way and means adopted by the positioning chip when it is in the working state. The working mode does not specifically refer to a specific working mode. For example, when the information of the application changes, the working mode may also change accordingly. For example, when the constellation configuration mode and/or the inertial navigation mode corresponding to the working mode changes, the working mode may also change accordingly.

According to some embodiments, the electronic device may receive the positioning request sent by the application, when the method for controlling the positioning chip is executed. The electronic device may obtain the information of the application, and determine a working mode of the positioning chip based on the information of the application.

At S103, resources for the positioning chip are controlled based on the working mode.

According to some embodiments, the electronic device may receive the positioning request sent by the application, when the method for controlling the positioning chip is executed. The electronic device may obtain information of the application, and determine the working mode of the positioning chip based on the information of the application. The electronic device may control the resources of the positioning chip based on the working mode. That is, the electronic device may control the satellite channel resources for the positioning chip based on the working mode.

In one or more embodiments of the present disclosure, the positioning request sent by the application is received, the information of the application is obtained, a working mode of the positioning chip is determined based on the information of the application, and the resources of the positioning chip are controlled based on the working mode. Therefore, the working mode of the positioning chip may be determined based on the information of the application, and then the resource may be controlled, which may balance the information of the application and the power consumption of the positioning chip, and reduce the occurrence of ineffective overhead of the power consumption when all the functions of the positioning chip being turned on, and the power consumption of the positioning chip may be reduced.

Figure 3:
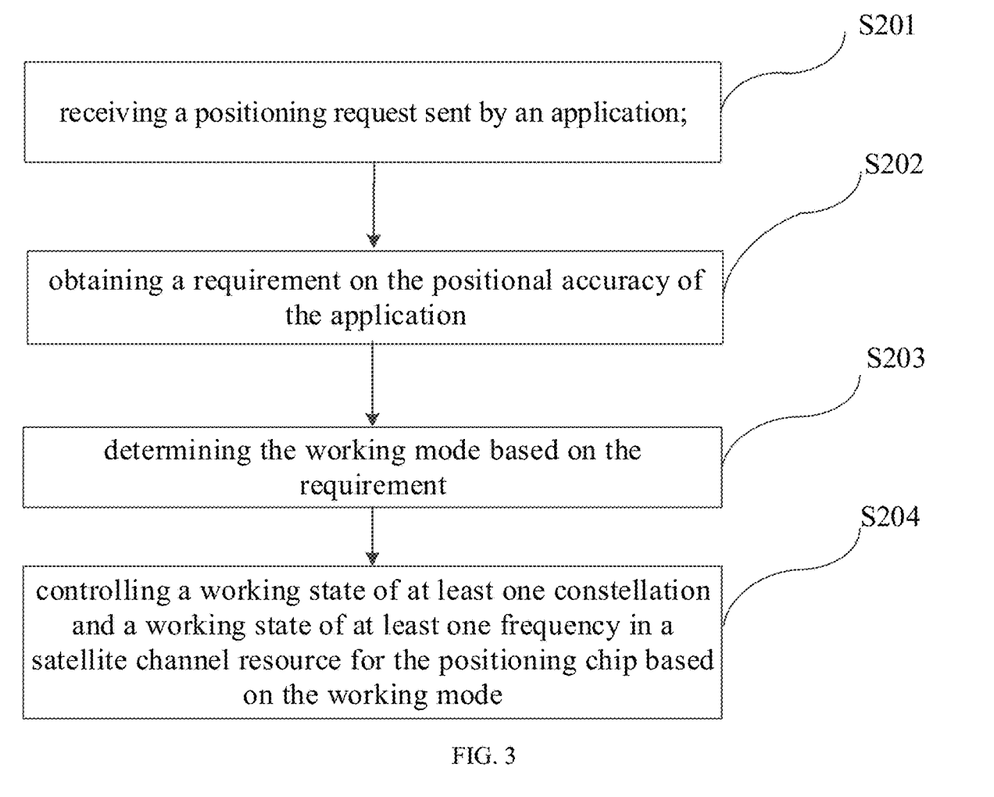
FIG. 3 illustrates a flow diagram of a method for controlling a second positioning chip provided in the embodiment of the present disclosure.

Referring to FIG. 3, which illustrates a schematic flow diagram of a method for controlling a second positioning chip provided in the embodiment of the present disclosure.

At S201, a positioning request sent by an application is received.

The specific process is as described above and will not be repeated here.

According to some embodiments, the application, for example, may be application A. The electronic device may obtain the positioning request sent by application A.

Figure 4:
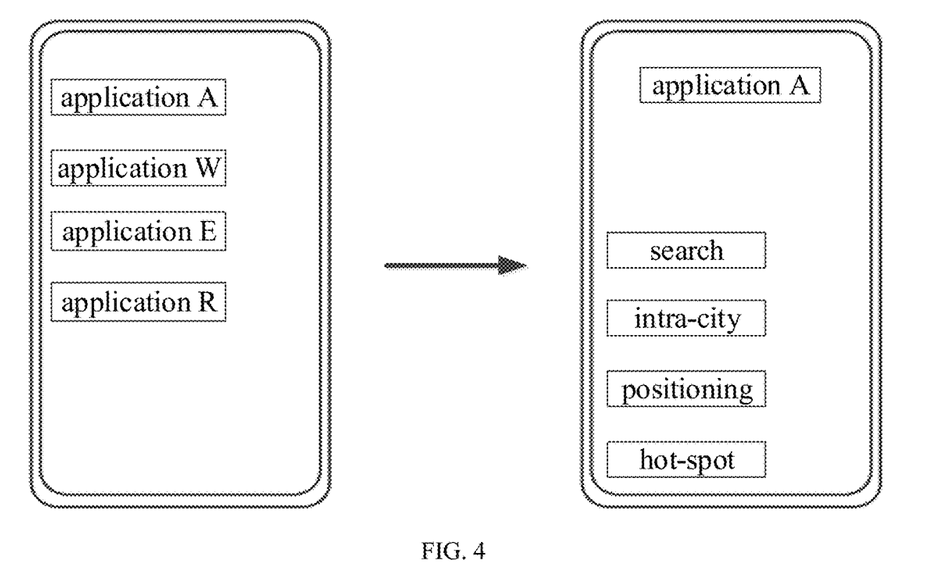
FIG. 4 is a schematic block diagram illustrating an electronic device in the embodiment of the present disclosure.

In some embodiments, the positioning request sent by the application may be a positioning request sent by the application when it is started, a positioning request sent when a positioning instruction is received, or a positioning request sent based on a preset time interval. For example, the positioning request sent by application A may be received, when application A receives the positioning instruction. At this time, a schematic diagram of the interface of the electronic device may be as shown in FIG. 4.

At S202, a requirement on the positioning accuracy of the application is obtained.

It is easy to understand that positioning accuracy is the degree of proximity between the position information (usually coordinates) of a spatial entity and its true position. The positioning accuracy in the embodiment of the present disclosure may be, for example, the degree of proximity between the position information of the electronic device and the real position of the electronic device.

Alternatively, the requirement refers to information required for the positioning accuracy of the application. The requirement does not specifically refer to specific information. For example, when the application changes, the requirement on the positioning accuracy of the application may also change accordingly. For example, when the state of the electronic device changes, the requirement on the positioning accuracy of the application may also change accordingly.

According to some embodiments, the electronic device may obtain a type of the application, when the electronic device receives the positioning request sent by the application. The electronic device obtains the requirement on the positioning accuracy of the application based on the type.

In some embodiments, the requirement on the positioning accuracy of the application is obtained by a neural network model, when the electronic device obtains the requirement on the positioning accuracy of the application. For example, the electronic device may obtain the requirement on the positioning accuracy of the application by the neural network model based on the type. Different applications correspond to different types.

In some embodiments, the electronic device may obtain the type of the application, when the electronic device receives the positioning request sent by the application. When the electronic device determines the requirement on the positioning accuracy of the application based on the type of the application, the electronic device may use, for example, an artificial intelligence (AI) neural network model to identify the application, to obtain the type of the application, and to determine the requirement on the positioning accuracy of the application based on the type. The AI model does not specifically refer to a specific model. For example, when the algorithm corresponding to the AI model changes, the AI model may also change accordingly.

It is easy to understand that the requirement on the positioning accuracy of the application obtained by the electronic device is not limited to use the AI model, which may be obtained by other information acquiring models.

Alternatively, when the electronic device determines the requirement on the positioning accuracy of the application based on the type of the application, the electronic device may, for example, use a data table to determine the requirement on the positioning accuracy of the application based on the type. The data table may record the requirements on the positioning accuracy of at least one application.

According to some embodiments, the electronic device may periodically obtain the data table from the server, or may modify the data table when a modification instruction for the requirements corresponding to the target application in the data table is detected. It is easy to understand that, in the process of obtaining the requirement on the positioning accuracy of the application by the electronic device, it may obtain the type of the application, and the requirement on the positioning accuracy of the application may be obtained based on the type. Different types correspond to different requirements of positioning accuracy.

According to some embodiments, the type refers to information used to indicate a category formed by things with common properties and characteristics corresponding to the application. The type does not specifically refer to a specific application. For example, when the application changes, the type may also change accordingly.

In some embodiments, for example, the electronic device may obtain the type of application A, when the electronic device receives the positioning request sent by the application A.

In some embodiments, the electronic device may obtain the type of application A, when the electronic device receives the positioning request sent by application A. The type of application A may be, for example, a type of map. The electronic device determines the requirement on the positioning accuracy of application A based on the type of application A. For example, it may be a requirement of HIGH_Accuracy. The requirement on the positioning accuracy of application A determined by the electronic device may also be, for example, a requirement of LOW_Accuracy.

At S203, the working mode is determined based on the requirement.

According to some embodiments, the electronic device may obtain the type of the application, when the electronic device receives the positioning request sent by the application. The electronic device obtains the requirement on the positioning accuracy of the application based on the type. The electronic device determines the working mode based on the requirement. Different working modes correspond to different power consumption of the positioning chip. The more precise the positioning accuracy is, the more power consumption of the positioning chip is.

It is easy to understand that the positioning chip may be, for example, a GNSS positioning chip, or other satellite system positioning chips.

Figure 5:
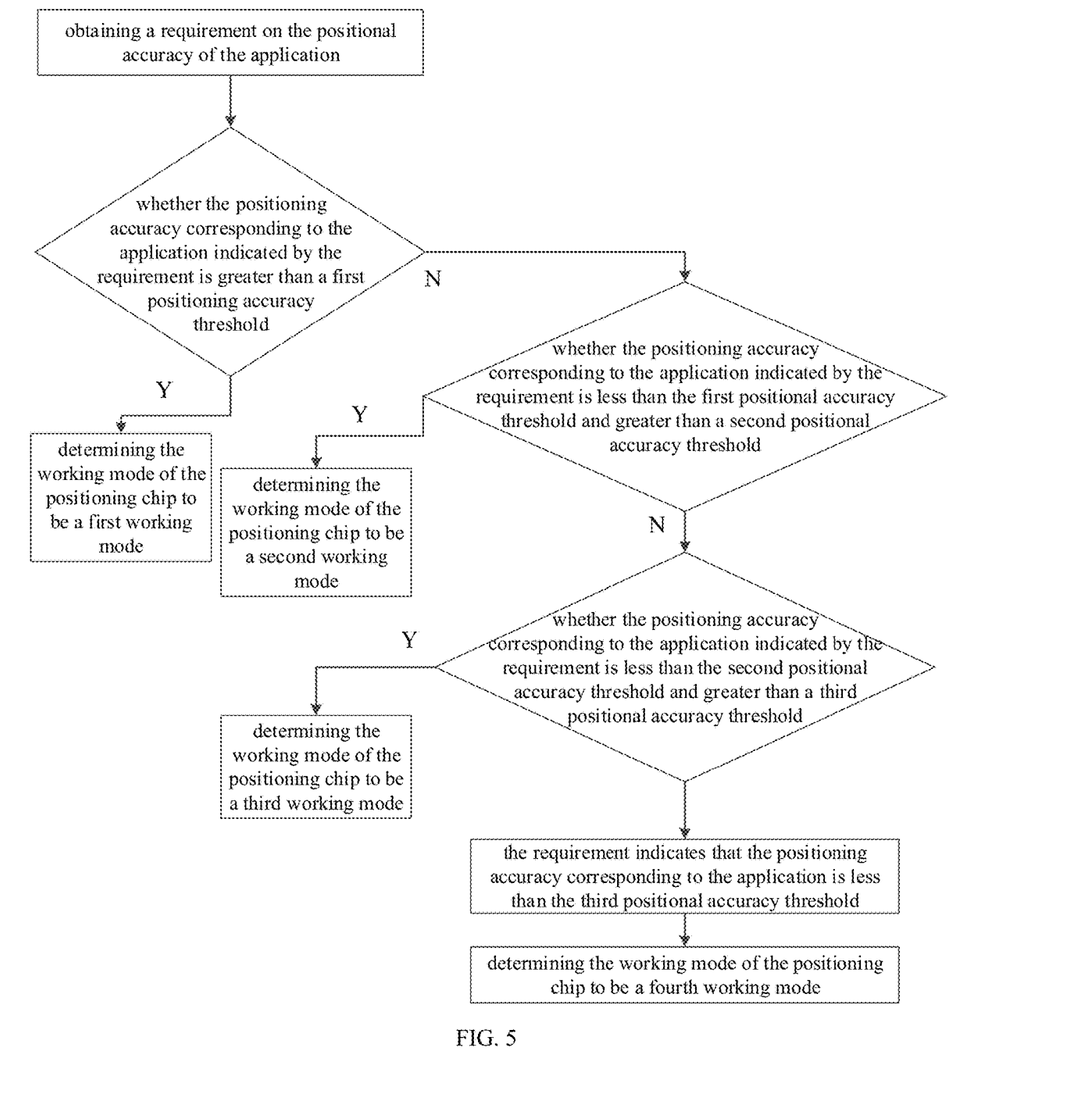
FIG. 5 illustrates a flow diagram of a method for controlling a third positioning chip provided in the embodiment of the present disclosure.

According to some embodiments, FIG. 5 illustrates a schematic flow diagram of a method for controlling a third positioning chip provided in the embodiment of the present disclosure. As illustrated in FIG. 5, in the process of determining the working mode of the positioning chip based on the requirement by the electronic device, if the requirement indicates that the positioning accuracy corresponding to the application is greater than a first positioning accuracy threshold, then the working mode of the positioning chip is determined to be a first working mode. The first working mode includes a first constellation configuration mode. The first constellation configuration mode includes a full constellation mode and a multi-frequency mode.

Alternatively, multiple frequencies include but are not limited to L5 frequency, L2C (L2 frequency civil signal) frequency, satellite-based augmentation system (SBAS) frequency, etc. The L5 is the third civil Global Positioning System (GPS) signal, which is beneficial to cycle slip detection, ionospheric delay error correction and whole cycle ambiguity determination in the GPS measurement process, which improves the civilian positioning accuracy from 5 meters to 30 cm.

In some embodiments, the first positioning accuracy threshold refers to an accuracy threshold for determining the first working mode based on the positioning accuracy. The first positioning accuracy threshold does not specifically refer to a specific accuracy threshold. The "first" of the first positioning accuracy threshold is only configured to distinguish from other positioning accuracy thresholds, and does not specifically refer to a specific accuracy threshold. For example, when the electronic device receives a modification instruction for the first positioning accuracy threshold, the first positioning accuracy threshold may also change accordingly.

It is easy to understand that the first working mode refers to the working mode of the positioning chip when the positioning accuracy corresponding to the application is greater than the first positioning accuracy threshold. The first working mode does not specifically refer to a specific working mode. For example, when the electronic device receives a mode modification instruction for the first working mode, the first working mode may also change accordingly.

Alternatively, the satellite constellation is a set of positioning system satellites that are launched into orbit and may work properly. Constellation configuration mode refers to a mode configured to determine the positioning system constellation. A constellation may, for example, refers to a galaxy. The first constellation configuration mode refers to a constellation configuration mode in which the positioning accuracy corresponding to the application is greater than the first positioning accuracy threshold. The "first" of the first constellation configuration mode is only used to distinguish it from other constellation configuration modes, and the first constellation configuration mode does not specifically refer to a certain specific mode. The first constellation configuration mode of the embodiment of the present disclosure includes a full constellation mode and a multi-frequency mode. The full constellation mode is a mode in which all constellations are turned on.

According to some embodiments, for example, the first positioning accuracy threshold may be that a proximity degree between the position information of the electronic device and the real position of the electronic device is 10 meters. The requirement on the positioning accuracy of application A may be, for example, that the proximity degree between the position information of the electronic device and the real position of the electronic device is 5 meters. The smaller the value of the proximity degree corresponding to the positioning accuracy is, the higher the positioning accuracy is. If the requirement on the positioning accuracy of application A indicates that the positioning accuracy corresponding to the application A is greater than the first positioning accuracy threshold, it is determined that the working mode of the positioning chip is the first working mode. Power consumption corresponding to the first working mode may be, for example, greater than 60 mA. The positioning accuracy of application A may be, for example, lane-level navigation accuracy, and an application scene corresponding to application A includes but is not limited to a vehicle CBD (central business district) scene, urban canyon scenarios, or a sports health application scene.

According to some embodiments, in the process of determining the working mode of the positioning chip based on the requirement by the electronic device, if the requirement indicates that the positioning accuracy corresponding to the application is less than the first positioning accuracy threshold and greater than a second positioning accuracy threshold, the working mode of the positioning chip is determined to be a second working mode. The second working mode includes a second constellation configuration mode. The second constellation configuration mode includes at least three constellations and a single frequency mode, the second positioning accuracy threshold is less than the first positioning accuracy threshold, and a number of at least three constellations is less than the total number of constellations.

Alternatively, the number of the at least three constellations is less than the total number of constellations. The number of full constellations may represent the total number of constellations. For example, when the total number of constellations is six, at least three constellations are one of four constellations, three constellations, and five constellations. For example, when the total number of constellations is five, at least three constellations are four constellations or three constellations. The number of constellations of at least three constellations does not refer to a specific number of constellations. For example, when the total number of constellations changes, the number of constellations of the at least three constellations may also change accordingly.

In some embodiments, the second positioning accuracy threshold refers to an accuracy threshold for determining the second working mode based on the positioning accuracy. The second positioning accuracy threshold does not specifically refer to a specific accuracy threshold. The "second" of the second positioning accuracy threshold is only used to distinguish it from other positioning accuracy thresholds, and does not specifically refer to a certain specific accuracy threshold. For example, when the electronic device receives a modification instruction for the second positioning accuracy threshold, the second positioning accuracy threshold may also change accordingly.

It is easy to understand that the second working mode refers to the working mode of the positioning chip with the positioning accuracy corresponding to the application being less than the first positioning accuracy threshold and greater than the second positioning accuracy threshold. The second working mode does not specifically refer to a specific working mode. For example, when the electronic device receives a mode modification instruction for the second working mode, the second working mode may also change accordingly.

According to some embodiments, the total number of constellations may be, for example, five. The electronic device may further define the second working mode. For example, when the requirement is 10 m to 20 m, the second working mode may be four constellations and a single frequency mode, and the power consumption corresponding to the second working mode may be, for example, greater than 50 mA and less than 60 mA. For example, when the requirement is 20 m to 50 m, the second working mode may be three constellations and a single frequency mode, and the power consumption corresponding to the second working mode may be, for example, greater than 30 mA and less than 40 mA. The power consumption of the positioning chip corresponding to the first working mode is greater than the power consumption of the positioning chip corresponding to the second working mode.

According to some embodiments, the first positioning accuracy threshold may be that the proximity degree between the position information of the electronic device and the real position of the electronic device is 10 meters. The second positioning accuracy threshold may be, for example, that the proximity degree between the position information of the electronic device and the real position of the electronic device is 20 meters. The requirement on the positioning accuracy of application A may be, for example, that the proximity degree between the position information of the electronic device and the real position of the electronic device is 15 meters. The smaller the value of the proximity degree corresponding to the positioning accuracy is, the higher the positioning accuracy is. If the requirement on the positioning accuracy of application A indicates that the positioning accuracy corresponding to application A is less than the first positioning accuracy threshold and greater than the second positioning accuracy threshold, the working mode of the positioning chip is determined to be the second working mode. The power consumption corresponding to the second working mode may be, for example, greater than 50 mA and less than 60 mA.

According to some embodiments, the method further includes the following steps. The electronic device performs scene recognition on the application, and obtains a scene corresponding to the application. The electronic device may determine the inertial navigation mode corresponding to the scene when the scene meets the scene condition. The inertial navigation mode includes the inertial navigation pedestrian dead reckoning (PDR) or the inertial navigation vehicle dead reckoning (VDR), which may improve the accuracy of determination of the inertial navigation mode. The electronic device may not start the inertial navigation mode when the scene does not meet a scene condition.

In some embodiments, the scene condition refers to condition for determining whether to enable the inertial navigation mode. The scene condition does not specifically refer to a specific condition. For example, when the electronic device receives an adding instruction for scene condition, the scene condition may also change accordingly.

It is easy to understand that the electronic device may obtain the scene corresponding to the application by adopting the scene recognition model, and may also determine the scene corresponding to the application based on the connection status between the electronic device and other devices.

According to some embodiments, for example, the application may be a third-party application, which may be a map-type application. The electronic device may obtain the scene corresponding to the third-party application. For example, it may obtain the scene where the electronic device is currently located. For example, the electronic device may detect whether the electronic device and a vehicle bracket are in a mounted state, or the electronic device may detect whether the third-party application is in a motion state. The motion state includes but is not limited to, a running state, a walking state, etc.

In some embodiments, the scene condition may be, for example, that the electronic device and the vehicle bracket are in the mounted state, and the electronic device is in a navigation state. For example, the inertial navigation mode determined by the electronic device may be inertial navigation vehicle dead reckoning, when the electronic device determines that the electronic device and the vehicle bracket are in the mounted state, and the electronic device receives an instruction to start navigation. For example, when the electronic device only determines that the electronic device and the vehicle bracket are in the mounted state, the electronic device may not activate the inertial navigation mode. When the electronic device determines that the application is used to record the step count state, the inertial navigation mode determined by the electronic device may be inertial navigation walker dead reckoning.

According to some embodiments, in the process of determining the working mode of the positioning chip based on the requirement by the electronic device, if the requirement indicates that the positioning accuracy corresponding to the application is less than the second positioning accuracy threshold and greater than a third positioning accuracy threshold, the working mode of the positioning chip is determined to be a third working mode. The third working mode includes a third constellation configuration mode. The third constellation configuration mode includes double constellations and a single frequency mode. The third positioning accuracy threshold is less than the second positioning accuracy threshold. The third working mode may be, for example, a balancing accuracy and power consumption BALANCE_ACCURACY_POWER mode.

In some embodiments, the third positioning accuracy threshold refers to an accuracy threshold for determining the third working mode based on the positioning accuracy. The third positioning accuracy threshold does not specifically refer to a specific accuracy threshold. The "third" of the third positioning accuracy threshold is only used to distinguish it from other positioning accuracy thresholds, and does not specifically refer to a certain specific accuracy threshold. For example, when the electronic device receives a modification instruction for the third positioning accuracy threshold, the third positioning accuracy threshold may also change accordingly.

It is easy to understand that the third working mode refers to the working mode of the positioning chip with the positioning accuracy corresponding to the application being less than the second positioning accuracy threshold and greater than the third positioning accuracy threshold. The third working mode does not specifically refer to a specific working mode. For example, when the electronic device receives a mode modification instruction for the third working mode, the third working mode may also change accordingly.

According to some embodiments, the second positioning accuracy threshold may be that the proximity degree between the position information of the electronic device and the real position of the electronic device is 50 meters. The third positioning accuracy threshold may be, for example, that the proximity degree between the position information of the electronic device and the real position of the electronic device is 100 meters. The requirement on the positioning accuracy of application A may be, for example, that the proximity degree between the position information of the electronic device and the real position of the electronic device is 75 meters. The smaller the value of the proximity degree corresponding to the positioning accuracy is, the higher the positioning accuracy is.

If the requirement on the positioning accuracy of application A indicates that the positioning accuracy corresponding to application A is less than the second positioning accuracy threshold and greater than the third positioning accuracy threshold, the working mode of the positioning chip is determined to be the third working mode. The power consumption corresponding to the third working mode may be, for example, greater than 20 mA and less than mA. That is, when the requirement on the positioning accuracy is low, the inertial navigation mode may be turned off, so that some constellations are turned on, which may reduce the power consumption of the positioning chip. The power consumption of the positioning chip corresponding to the second working mode is greater than the power consumption of the positioning chip corresponding to the third working mode.

According to some embodiments, in the process of determining the working mode of the positioning chip based on the requirement by the electronic device, if the requirement indicates that the positioning accuracy corresponding to the application is less than the third positioning accuracy threshold, then the working mode of the positioning chip is determined to be a fourth working mode. The fourth working mode includes a fourth constellation configuration mode, and the fourth constellation configuration mode includes a single constellation and a single frequency mode. The fourth working mode may be, for example, a PASSIVE mode or LOW_PWR mode.

In some embodiments, the third positioning accuracy threshold refers to an accuracy threshold for determining the fourth working mode based on the positioning accuracy. The third positioning accuracy threshold does not specifically refer to a specific accuracy threshold. The "third" of the third positioning accuracy threshold is only used to distinguish it from other positioning accuracy thresholds, and does not specifically refer to a certain specific accuracy threshold. For example, when the electronic device receives a modification instruction for the third positioning accuracy threshold, the third positioning accuracy threshold may also change accordingly.

It is easy to understand that the fourth working mode refers to the working mode of the positioning chip with the positioning accuracy corresponding to the application being less than the third positioning accuracy threshold. The fourth working mode does not specifically refer to a specific working mode. For example, when the electronic device receives a mode modification instruction for the fourth working mode, the fourth working mode may also change accordingly.

According to some embodiments, the third positioning accuracy threshold may be that the proximity degree between the position information of the electronic device and the real position of the electronic device is 100 meters. The requirement on the positioning accuracy of application A may be, for example, that the proximity degree between the position information of the electronic device and the real position of the electronic device is 150 meters. The smaller the value of the proximity degree corresponding to the positioning accuracy is, the higher the positioning accuracy is. If the requirement on the positioning accuracy of application A indicates that the positioning accuracy corresponding to the application A is less than the third positioning accuracy threshold, it is determined that the working mode of the positioning chip is the fourth working mode. The power consumption corresponding to the fourth working mode may be, for example, greater than 10 mA and less than 20 mA. The power consumption of the positioning chip corresponding to the third working mode is greater than the power consumption of the positioning chip corresponding to the fourth working mode.

At S204, a working state of at least one constellation and a working state of at least one frequency in satellite channel resources for the positioning chip are controlled based on the working mode.

According to some embodiments, when the electronic device obtains the working mode of the positioning chip, the electronic device may control the working state of at least one constellation and the working state of at least one frequency in the satellite channel resources of the positioning chip based on the working mode.

In some embodiments, when the electronic device determines that the working mode of the positioning chip is the first working mode, the electronic device may control the working state of at least one constellation in the satellite channel resources of the positioning chip and the working mode of at least one frequency to be turned on.

It is easy to understand that the GNSS module, for example, may provide a Power Switch Interface. The electronic device may control the working state of at least one constellation and the working state of at least one frequency in the satellite channel resources of the positioning chip by the Power Switch Interface in the GNSS module based on the working mode.

Figure 6:
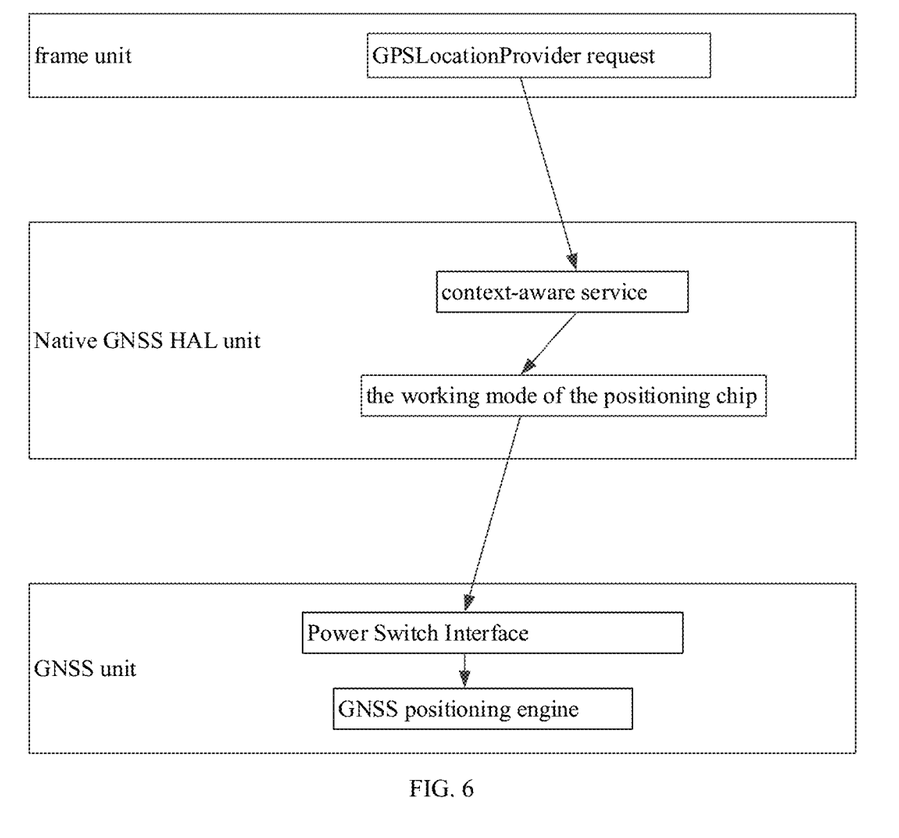
FIG. 6 is a block diagram for performing a method for controlling a positioning chip provided by an embodiment of the present disclosure.

According to some embodiments, FIG. 6 is a block diagram for performing a method for controlling a positioning chip provided by an embodiment of the present disclosure. As illustrated in FIG. 6, the electronic device includes a framework unit, a native GNSS HAL unit, and a GNSS unit. The framework unit may initiate a GPSLocationProvider request of the GPS positioning program. The context-aware service in the Native GNSS HAL unit may receive the GPSLocationProvider request and determine the type of the third-party program. The requirement on the positioning accuracy of the application is determined based on the type of the application, the working mode of the positioning chip is determined based on the requirement, and the working mode is transmitted to the GNSS unit. The GNSS unit may control resources for the positioning chip. For example, the GNSS unit may provide a Power Switch Interface and a GNSS positioning engine, and may control the resources for the positioning chip based on the working mode of the positioning chip.

In one or more embodiments of the present disclosure, a positioning request sent by an application is received, and the requirement on the positioning accuracy of the application may be obtained. The working mode of the positioning chip may be determined based on the requirement. The accuracy of determination of the working mode may be improved, the accuracy of resource control may be improved, and power consumption of the positioning chip may be reduced. At the same time, the inaccurate determination of the working mode caused by the signal strength determining the working mode of the GNSS positioning chip may be reduced. The working state of at least one constellation and the working state of at least one frequency in the satellite channel resources of the positioning chip are controlled based on the working mode, that is, the satellite channel resources corresponding to the working mode are turned on. The case of poorly positioning of the application may be reduced, and the case is caused by direct access to black and white lists or gesture recognition by intercepting some third-party applications calling the GNSS chip. It may balance the information of the application and the power consumption of the positioning chip, and the case of the ineffective overhead of the power consumption may be reduced when all functions of the positioning chip are turned on. The power consumption of the positioning chip may be reduced. At the same time, the power consumption risk existing in the power consumption-sensitive electronic device may be reduced, and the safety of the use of the electronic device is improved.

Collection, storage, use, processing, transmission, provision and disclosure of the user personal information involved in the technical solution of the present disclosure comply with relevant laws and regulations, and do not violate public order and good customs.

The following apparatus embodiments of the present disclosure may be configured to execute the method embodiments of the present disclosure. The undisclosed details in apparatus embodiments of the present disclosure may refer to method embodiments of the present disclosure.

Figure 7:
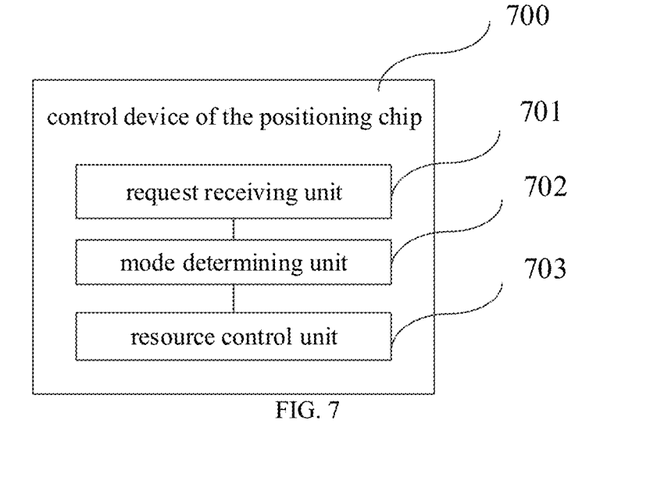
FIG. 7 is a schematic diagram of a control device for a first positioning chip provided by an embodiment of the present disclosure.

Referring to FIG. 7, which shows a schematic diagram of a control device of a first positioning chip provided by an illustrative embodiment of the present disclosure. The control device of the positioning chip may be realized as all or a part of the device in a form of software, hardware or a combination of the two. The control device 700 of the positioning chip includes a request receiving unit 701, a mode determining unit 702 and a resource control unit 703.

The request receiving unit 701 is configured to receive a positioning request sent by an application.

The mode determining unit 702 is configured to obtain information of the application, and determining a working mode of the positioning chip based on the information of the application.

The resource control unit 703 is configured to control resources for the positioning chip based on the working mode.

Figure 8:
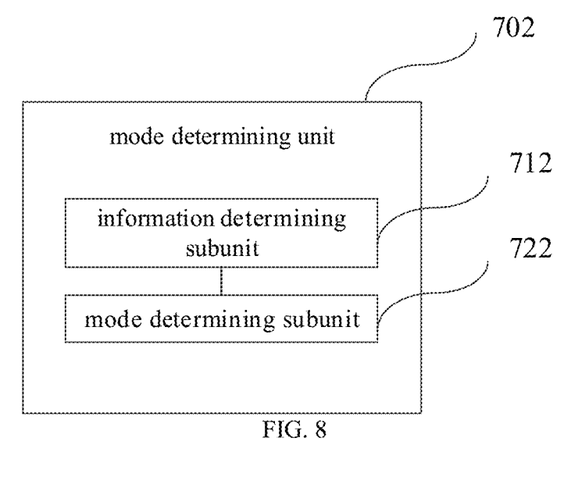
FIG. 8 is a schematic diagram of a control device for a second positioning chip provided by an embodiment of the present disclosure.

According to some embodiments, FIG. 8 is a schematic diagram of a control device of a second positioning chip provided by an embodiment of the present disclosure; As illustrated in FIG. 8, the mode determining unit 702 includes an information acquiring subunit 712 and a mode determining subunit 722. The mode determining unit 702 is configured to acquire the information of the application and determine the working mode of the positioning chip based on the information of the application.

The information acquiring subunit 712 is configured to obtain a requirement on the positioning accuracy of the application.

The mode determining subunit 722 is configured to determine the working mode of the positioning chip based on the requirement.

According to some embodiments, the mode determining subunit 722 is configured to determine the working mode of the positioning chip based on the requirement, and specifically configured to determine the working mode of the positioning chip to be a first working mode, in response to determining that the requirement indicates that the positioning accuracy corresponding to the application is greater than a first positioning accuracy threshold. The first working mode includes a first constellation configuration mode. The first constellation configuration mode includes full constellation and multi-frequency mode.

According to some embodiments, the mode determining subunit 722 is configured to determine the working mode of the positioning chip based on the requirement, and specifically configured to determine the working mode of the positioning chip to be a second working mode, in response to determining that the requirement indicates that the positioning accuracy corresponding to the application is less than a first positioning accuracy threshold and greater than a second positioning accuracy threshold. The second working mode includes a second constellation configuration mode. The second constellation configuration mode includes at least three constellations and a single frequency mode. The second positioning accuracy threshold is less than the first positioning accuracy threshold, and a number of the at least three constellations is less than a total number of constellations.

According to some embodiments, the mode determination subunit 722 is further configured to perform a scene recognition for the application, and obtain a scene corresponding to the application.

An inertial navigation mode corresponding to the scene is determined when the scene meets a scene condition. The inertial navigation mode includes inertial navigation pedestrian dead reckoning or inertial navigation vehicle dead reckoning.

According to some embodiments, the mode determining subunit 722 is configured to determine the working mode of the positioning chip based on the requirement, and specifically configured to determine the working mode of the positioning chip to be a third working mode, in response to determining that the positioning accuracy corresponding to the application is less than a second positioning accuracy threshold and greater than a third positioning accuracy threshold. The third working mode includes a third constellation configuration mode, the third constellation configuration mode includes double constellations and a single frequency mode, and the third positioning accuracy threshold is less than the second positioning accuracy threshold.

According to some embodiments, the mode determining subunit 722 is configured to determine the working mode of the positioning chip based on the requirement, and specifically configured to determine the working mode of the positioning chip to be a fourth working mode, in response to determining that the positioning accuracy corresponding to the application is less than a third positioning accuracy threshold. The fourth working mode includes a fourth constellation configuration mode, and the fourth constellation configuration mode includes single constellation and a single frequency mode.

According to some embodiments, the mode determining subunit 722 is configured to obtain a requirement on the positioning accuracy of the application, and specifically configured to obtain the requirement on the positioning accuracy of the application by a neural network model;

According to some embodiments, the mode determining subunit 722 is configured to obtain the requirement on the positioning accuracy of the application, and specifically configured to obtain the type of the application; and to obtain the requirement on the positioning accuracy of the application based on the type.

According to some embodiments, the resource control unit 703 is configured to control resources for the positioning chip based on the working mode, and specifically configured to control a working state of at least one constellation and a working state of at least one frequency in satellite channel resources for the positioning chip based on the working mode.

It should be noted that, the above function modules are merely illustrated for exemplary purpose, when the control device of the positioning chip provided in the above embodiments implements the method for controlling the positioning chip. In practical applications, the above functions may be implemented by different function modules as required. The internal structure of the electronic device may be divided into different functional modules to implement all or part of the functions described above. In addition, the control device of the positioning chip and the control method of the positioning chip provided in the above embodiments belong to the same concept, and the implementation process is described in the method embodiment, which will not be repeated here.

The serial numbers of the embodiments of the present disclosure are merely for description, and do not represent advantages and disadvantages of the embodiments.

In one or more embodiments of the present disclosure, a request receiving unit receives the positioning request sent by an application, and a mode determining unit obtains information of the application. A working mode of the positioning chip is determined based on the information of the application, and a resource control unit controls resources of the positioning chip based on the working mode. Therefore, the working mode of the positioning chip may be determined based on the information of the application, and then the resource control may be performed, which may balance the information of the application and the power consumption of the positioning chip, and reduce the occurrence of ineffective overhead of the power consumption when all the functions of the positioning chip being turned on, and the power consumption of the positioning chip may be reduced.

The acquisition, storage, and application of the user personal information involved in the technical solution of the present disclosure comply with relevant laws and regulations, and do not violate public order and good customs.

According to the embodiment of the present disclosure, an electronic device, a readable storage medium and a computer program product are further provided in the present disclosure.

Figure 9:
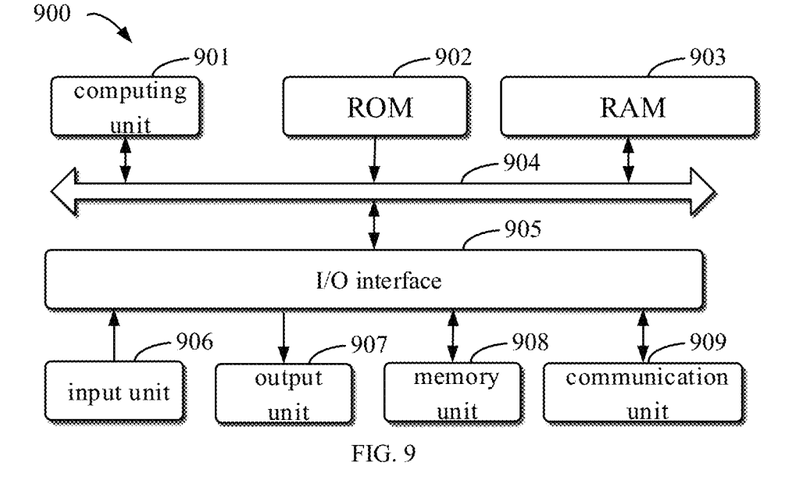
FIG. 9 is a block diagram of an electronic device configured to perform a method for controlling a positioning chip in the embodiment of the present disclosure.

FIG. 9 illustrates a schematic block diagram of an example electronic device 900 configured to implement an embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the present disclosure described and/or required herein.

As illustrated in FIG. 9, the electronic device 900 includes a computing unit 901, which may execute various appropriate actions and processes based on a computer program stored in a read-only memory (ROM) 902 or a computer program loaded into a random access memory (RAM) 903 from a storage unit 908. In the RAM 903, various programs and data required for operation of the electronic device 900 also may be stored. The computing unit 901, a ROM 1202 and a RAM 903 may be connected with each other by a bus 904. An input/output (I/O) interface 905 is also connected to a bus 904.

A plurality of components in the electronic device 900 are connected to an I/O interface 905, and includes: an input unit 906, for example, a keyboard, a mouse, etc.; an output unit 907, for example various types of displays, speakers; a storage unit 908, for example a magnetic disk, an optical disk; and a communication unit 909, for example, a network card, a modem, a wireless transceiver. A communication unit 909 allows the electronic device 900 to exchange information/data through a computer network such as internet and/or various types of telecommunication networks and other electronic devices.

The computing unit 901 may be various general-purpose and/or special-purpose processing components with processing and computing capacities. Some examples of the computing unit 901 include but are not limited to a central processing unit (CPU), a graphics processing unit (GPU), various dedicated artificial intelligence (AI) computing chips, a computing unit executing various machine learning model algorithms, a digital signal processor (DSP), and any suitable processor, controller, microcontroller, or etc. The computing unit 901 performs various methods and processes described above, for example, a method for controlling a positioning chip robot. For example, in some embodiments, a method for controlling a positioning chip may be implemented as a computer software program tangibly included in a machine-readable medium, such as a storage unit 908. In some embodiments, some or all of the computer programs may be loaded and/or mounted on the electronic device 900 via a ROM 902 and/or a communication unit 909. When the computer programs are loaded in a RAM 903 and performed by a computing unit 901, one or more blocks of the above method for controlling a positioning chip may be performed. Alternatively, in other embodiments, the computing unit 901 may be configured to perform the method for controlling a positioning chip by any other suitable means (for example, by means of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device (CPLD), a computer hardware, a firmware, a software, and/or combinations thereof. The various implementation modes may include: being implemented in one or more computer programs, the one or more computer programs may be executed and/or interpreted on a programmable system including at least one programmable processor, the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, performed partly on the machine as an independent software package and performed partly or completely on the remote machine or server.

In the context of the present disclosure, a machine-readable medium may be a tangible medium that may contain or store a program intended for use in or in conjunction with an instruction execution system, apparatus, or device. The machine-readable medium may be a machine readable signal medium or a machine readable storage medium. The machine-readable storage medium may include, but is not limited to, an electronic, magnetic, optical, electromagnetic, infrared, or semiconductor system, apparatus or device, or any appropriate combination thereof. A more specific example of the machine-readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with a user, the systems and technologies described here may be implemented on a computer, and the computer has: a display apparatus for displaying information to a user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphic user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs executed on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

It's understandable that various forms of procedures shown above may be configured to reorder, add or delete blocks. For example, blocks described in the present disclosure may be executed in parallel, sequentially, or in different orders, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for controlling a positioning chip, performed by an electronic device, comprising:
   receiving a positioning request sent by an application;
   obtaining information of the application, and determining a working mode of the positioning chip based on the information of the application;
   controlling satellite channel resources for the positioning chip based on the working mode; and
   providing a positioning result for the application using controlled satellite channel resources;
   wherein, determining a working mode of the positioning chip based on the information of the application comprises:
   obtaining a requirement on the positioning accuracy of the application; and
   determining the working mode based on the requirement;
   wherein determining the working mode based on the requirement comprises:
   determining the working mode of the positioning chip to be a second working mode, in response to determining that the requirement indicating that the positioning accuracy corresponding to the application being less than a first positioning accuracy threshold and greater than a second positioning accuracy threshold,
   wherein the second working mode comprises a second satellite constellation configuration mode, the second satellite constellation configuration mode comprises at least three satellite constellations and a single frequency mode, the second positioning accuracy threshold is less than the first positioning accuracy threshold, and a number of the at least three satellite constellations is less than a total number of satellite constellations.

2. The method of claim 1, wherein, determining the working mode based on the requirement comprises:
  determining the working mode of the positioning chip to be a first working mode, in response to determining that the requirement indicating that the positioning accuracy corresponding to the application being greater than a first positioning accuracy threshold,
  wherein the first working mode comprises a first satellite constellation configuration mode, and the first satellite constellation configuration mode comprises a full satellite constellation and a multi-frequency mode.

3. The method of claim 1, wherein, determining the working mode based on the requirement comprises:
  determining the working mode of the positioning chip to be a third working mode, in response to determining that the positioning accuracy corresponding to the application being less than a second positioning accuracy threshold and greater than a third positioning accuracy threshold,
  wherein the third working mode comprises a third satellite constellation configuration mode, the third satellite constellation configuration mode comprises double satellite constellations and a single frequency mode, and the third positioning accuracy threshold is less than the second positioning accuracy threshold.

4. The method of claim 1, wherein, determining the working mode based on the requirement comprises:
  determining the working mode of the positioning chip to be a fourth working mode, in response to determining that the positioning accuracy corresponding to the application being less than a third positioning accuracy threshold,
  wherein the fourth working mode comprises a fourth satellite constellation configuration mode, and the fourth satellite constellation configuration mode comprises single satellite constellation and a single frequency mode.

5. The method of claim 1, wherein, determining a requirement indicating the positioning chip based on the information of the application comprises:
  obtaining a requirement on the positioning accuracy of the application by a neural network model.

6. The method of claim 1, wherein, obtaining a requirement on the positioning accuracy of the application comprises:
  obtaining a type of the application, wherein the application is a map-type application; and
  obtaining a requirement on the positioning accuracy of the application based on the type.

7. The method of claim 1, wherein, controlling the satellite channel resources for the positioning chip based on the working mode comprises:
  controlling a working state of at least one satellite constellation and a working state of at least one frequency in the satellite channel resources for the positioning chip based on the working mode.

8. An electronic device, comprising:
  at least one processor; and
  a memory communicatively coupled to the at least one processor; wherein,
  the memory is stored with instructions executable by the at least one processor, and the processor is configured to:
  receive a positioning request sent by an application;
  obtain information of the application, and determine a working mode of a positioning chip based on the information of the application;
  control satellite channel resources for the positioning chip based on the working mode; and
  provide a positioning result for the application using controlled satellite channel resources;
  wherein the processor is configured to:
  obtain a requirement on the positioning accuracy of the application; and
  determine the working mode based on the requirement;
  wherein when determines the working mode based on the requirement, the processor is configured to:
  determine the working mode of the positioning chip to be a second working mode, in response to determining that the requirement indicating that the positioning accuracy corresponding to the application being less than a first positioning accuracy threshold and greater than a second positioning accuracy threshold,
  wherein the second working mode comprises a second satellite constellation configuration mode, the second satellite constellation configuration mode comprises at least three satellite constellations and a single frequency mode, the second positioning accuracy threshold is less than the first positioning accuracy threshold, and a number of the at least three satellite constellations is less than a total number of satellite constellations.

9. The electronic device of claim 8, wherein the processor is configured to:
  determine the working mode of the positioning chip to be a first working mode, in response to determining that the requirement indicating that the positioning accuracy corresponding to the application being greater than a first positioning accuracy threshold,
  wherein the first working mode comprises a first satellite constellation configuration mode, and the first satellite constellation configuration mode comprises a full satellite constellation and a multi-frequency mode.

10. The electronic device of claim 8, wherein the processor is configured to:
  determine the working mode of the positioning chip to be a third working mode, in response to determining that the positioning accuracy corresponding to the application being less than a second positioning accuracy threshold and greater than a third positioning accuracy threshold,
  wherein the third working mode comprises a third satellite constellation configuration mode, the third satellite constellation configuration mode comprises double satellite constellations and a single frequency mode, and the third positioning accuracy threshold is less than the second positioning accuracy threshold.

11. The electronic device of claim 8, wherein the processor is configured to:
  determine the working mode of the positioning chip to be a fourth working mode, in response to determining that the positioning accuracy corresponding to the application being less than a third positioning accuracy threshold,
  wherein the fourth working mode comprises a fourth satellite constellation configuration mode, and the fourth satellite constellation configuration mode comprises single satellite constellation and a single frequency mode.

12. The electronic device of claim 8, wherein the processor is configured to:
  obtain a requirement on the positioning accuracy of the application by a neural network model.

13. The electronic device of claim 8, wherein the processor is configured to:

obtain a type of the application, wherein the application is a map-type application; and obtain a requirement on the positioning accuracy of the application based on the type.

14. The electronic device of claim 8, wherein the processor is configured to:

control a working state of at least one satellite constellation and a working state of at least one frequency in the satellite channel resources for the positioning chip based on the working mode.

15. A non-transitory computer-readable storage medium having computer instructions stored thereon, wherein the computer instructions being configured to cause a processor in an electronic device to perform a method for controlling a positioning chip, wherein the method comprising:

receiving a positioning request sent by an application;

obtaining information of the application, and determining a working mode of the positioning chip based on the information of the application;

controlling satellite channel resources for the positioning chip based on the working mode; and wherein, determining a working mode of the positioning chip based on the information of the application comprises:

obtaining a requirement on the positioning accuracy of the application; and determining the working mode based on the requirement;

wherein determining the working mode based on the requirement comprises:

determining the working mode of the positioning chip to be a second working mode, in response to determining that the requirement indicating that the positioning accuracy corresponding to the application being less than a first positioning accuracy threshold and greater than a second positioning accuracy threshold, wherein the second working mode comprises a second satellite constellation configuration mode, the second satellite constellation configuration mode comprises at least three satellite constellations and a single frequency mode, the second positioning accuracy threshold is less than the first positioning accuracy threshold, and a number of the at least three satellite constellations is less than a total number of satellite constellations.

* * * * *